United States Patent
Nakamura et al.

(10) Patent No.: US 10,917,221 B2
(45) Date of Patent: Feb. 9, 2021

(54) BASE STATION APPARATUS, TERMINAL APPARATUS, AND COMMUNICATION METHOD

(71) Applicants: SHARP KABUSHIKI KAISHA, Sakai (JP); FG Innovation Company Limited, Tuen Mun (HK)

(72) Inventors: Osamu Nakamura, Sakai (JP); Takashi Yoshimoto, Sakai (JP); Jungo Goto, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/470,424

(22) PCT Filed: Dec. 20, 2017

(86) PCT No.: PCT/JP2017/045663
§ 371 (c)(1),
(2) Date: Jun. 17, 2019

(87) PCT Pub. No.: WO2018/117139
PCT Pub. Date: Jun. 28, 2018

(65) Prior Publication Data
US 2019/0312714 A1 Oct. 10, 2019

(30) Foreign Application Priority Data
Dec. 21, 2016 (JP) .................... 2016-248067

(51) Int. Cl.
*H04L 5/00* (2006.01)
*H04L 1/18* (2006.01)
(Continued)

(52) U.S. Cl.
CPC .............. *H04L 5/0094* (2013.01); *H04J 1/00* (2013.01); *H04L 1/189* (2013.01); *H04L 5/0051* (2013.01); *H04L 27/26* (2013.01); *H04L 27/2636* (2013.01); *H04W 72/04* (2013.01); *H04W 72/042* (2013.01); *H04L 5/0007* (2013.01)

(58) Field of Classification Search
CPC ......... H04L 5/0094; H04L 1/00; H04L 1/189; H04L 5/0051; H04L 27/26; H04L 27/2636; H04W 72/04; H04W 72/042
See application file for complete search history.

(56) References Cited

U.S. PATENT DOCUMENTS

| | | | |
|---|---|---|---|
| 2009/0168811 A1* | 7/2009 | Seyama | H04J 3/02 |
| 2015/0009951 A1 | 1/2015 | Josiam et al. | |
| 2017/0311315 A1* | 10/2017 | Islam | H04W 72/04 |

FOREIGN PATENT DOCUMENTS

JP WO2016111221 * 7/2016 ............ H04W 74/08

OTHER PUBLICATIONS

Huawei, Hisilicon, "Waveform evaluation results for case 4," R1-166091, 3GPP TSG RAN WG1 Meeting #86 Gothenburg, Sweden, Aug. 22-26, 2016.
(Continued)

*Primary Examiner* — Ronald B Abelson
(74) *Attorney, Agent, or Firm* — ScienBiziP, P.C.

(57) ABSTRACT

A terminal apparatus using large FFT points transmits a reference signal such that short OFDM symbols are repeated.

3 Claims, 8 Drawing Sheets

(51) Int. Cl.
*H04W 72/04* (2009.01)
*H04J 1/00* (2006.01)
*H04L 27/26* (2006.01)

(56) References Cited

OTHER PUBLICATIONS

MEDIATEK INC., "An RX based interference mitigation method for waveform with multiple numerologies," R1-167529, Gothenburg, Sweden, Aug. 22-26, 2016.
LG Electronics, "Design of short duration UL control channel for NR", R1-1611843, 3GPP TSG RAN WG1 meeting #87, Reno, USA Nov. 14-18, 2016.
Ericsson, "Summary of offline discussion on UL Control Channels", 3GPP TSG RAN WG1 meeting #87, R1-1613349, Nov. 19, 2016.

\* cited by examiner

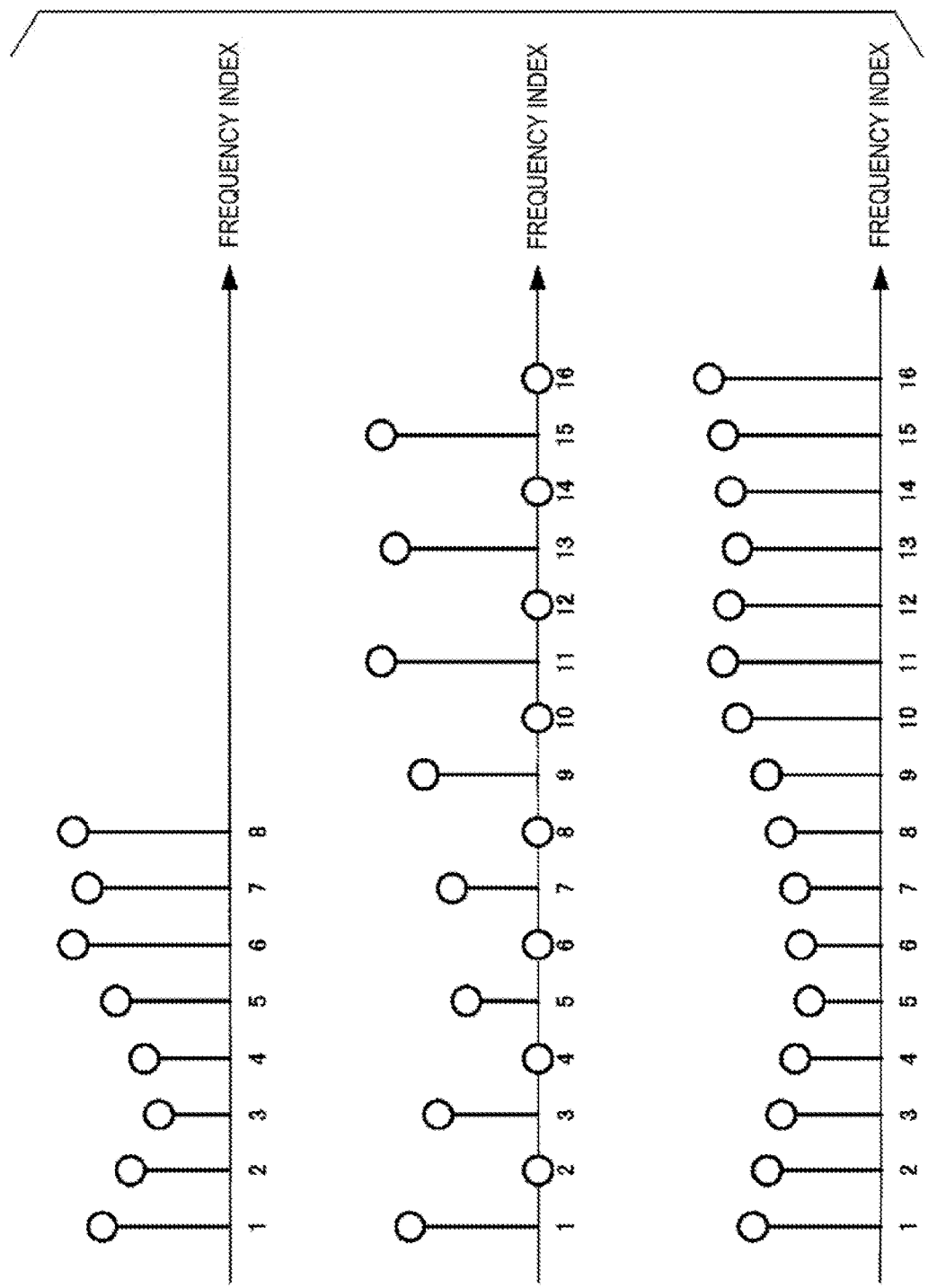

BASE STATION APPARATUS, TERMINAL APPARATUS, AND COMMUNICATION METHOD

TECHNICAL FIELD

The present invention relates to a base station apparatus, a terminal apparatus, and a communication method.

This application claims priority based on JP 2016-248067 filed on Dec. 21, 2016, the contents of which are incorporated herein by reference.

BACKGROUND ART

Because of the spread of smartphones, tablet terminals, and the like in recent years, a demand for high-speed wireless transmission has been increasing. The Third Generation Partnership Project (3GPP), a standardization group, has been investigating New Radio (NR) as the fifth generation mobile communication system (5G). Specifications have been set such that NR is configured so as to meet requirements of three use cases: enhanced Mobile Broadband (eMBB) performing large-capacity communications with high frequency efficiency; massive Machine Type Communication (mMTC) accommodating a large number of terminals; and Ultra-Reliable and Low Latency Communication (URLLC) achieving highly-reliable, low-latency communications. Long Term Evolution (LTE) has employed Orthogonal Frequency Division Multiplexing (OFDM) where an insertion of Cyclic Prefixes (CPs) ensures maintaining periodicity of signals in a frequency-selective fading channel. Here, in LTE, since all terminal apparatuses in a cell share an identical OFDM symbol length, namely, identical subcarrier spacing, multiaccess by Orthogonal Frequency Division Multiple Access (OFDMA) using orthogonality between subcarriers is possible. Meanwhile, considering uRLLC, setting specifications of an OFDM symbol length of NR shorter than that of LTE has been agreed. The specifications of the short OFDM symbol length ensure the achievement of low-latency communications compared with that in LTE.

To multiplex signals having different OFDM symbol lengths in a frequency domain, the orthogonality between the subcarriers cannot be maintained, and therefore an interference caused by a side lobe of a signal in an adjacent channel occurs. Therefore, NPL 1 and NPL 2 study that a side lobe is reduced by a band-pass filter of a transmitter to achieve frequency-division multiplexing (FDM).

CITATION LIST

Non Patent Literature

NPL 1: Huawei, HiSilicon, R1-166091, "Waveform evaluation results for case 4," Gothenburg, Sweden, August 2016.

NPL 2: MediaTek Inc., R1-167529, "An RX based interference mitigation method for waveform with multiple numerologies," Gothenburg, Sweden, August 2016.

SUMMARY OF INVENTION

Technical Problem

With a receiver including multiple receive antennas, uplink signals from respective terminal apparatuses are spatially-multiplexed, and thus the receiver can apply a spatial filtering. That is, MU-MIMO is applicable. The application of MU-MIMO allows the multiple terminal apparatuses to share identical time/frequency resources (radio resources), thus improving frequency utilization efficiency.

However, channel estimation is necessary for application of the spatial filtering. Since the subcarriers of the signals having different OFDM symbol lengths are not orthogonal, and this makes mutual pilots non-orthogonal. Therefore, significant degradation of channel estimation accuracy is anticipated.

One aspect of the present invention has been made in view of the above-described drawbacks, and an object of the present invention is to provide a base station apparatus, a terminal apparatus, and a communication method thereof that allow channel estimation with high accuracy in a case that spatial filtering of signals having different OFDM symbol lengths is performed.

Solution to Problem

To solve the above-described problems, respective base station and terminal according to one aspect of the present invention are configured as follows.

(1) To solve the above-described problem, a terminal apparatus according to an aspect of the present invention includes a reception unit, a resource element mapping unit, and a signal generation unit. The reception unit is configured to receive downlink control information from a base station apparatus. The resource element mapping unit is configured to map a data signal and a reference signal to a subcarrier. The signal generation unit is configured to transmit a transmission signal including the reference signal and the data signal. The downlink control information includes information on the number of repetitions of reference signal. The resource element mapping unit is configured to change the number of repetitions of reference signal according to the information on the repetition of the reference signal.

(2) Further, in the terminal apparatus according to an aspect of the present invention, the information on the number of repetitions may be configured according to a subcarrier spacing of the subcarriers.

(3) Further, in the terminal apparatus according to an aspect of the present invention, the resource element mapping unit may be configured to change a number of repetitions of a data signal mapped to an OFDM symbol including a reference signal according to the information on the repetition of the reference signal.

(4) To solve the above-described problem, a base station apparatus according to an aspect of the present invention includes a transmission unit and a signal receiving unit. The transmission unit is configured to transmit downlink control information. The signal receiving unit is configured to receive reception signals generated at multiple subcarrier spacings. The transmission unit is configured to notify a terminal apparatus of information on the number of repetitions of reference signal such that an identical signal is repeatedly generated in an OFDM symbol at least including a reference signal among the reception signals.

(5) A communication method of a terminal apparatus according to an aspect of the present invention includes the steps of: receiving downlink control information from a base station apparatus at the terminal apparatus; mapping a data signal and a reference signal to a subcarrier; and transmitting a transmission signal including the reference signal and the data signal. The downlink control information includes information on the number of repetitions of reference signal.

The mapping changes the number of repetitions of reference signal according to the information on the repetition of the reference signal.

(6) A communication method of a base station apparatus according to an aspect of the present invention includes the steps of: transmitting downlink control information to a terminal apparatus; and receiving reception signals generated at multiple subcarrier spacings. The transmitting notifies the terminal apparatus of information on the number of repetitions of reference signal such that an identical signal is repeatedly generated in an OFDM symbol at least including a reference signal among the reception signals.

Advantageous Effects of Invention

According to one aspect of the present invention, in a case that the signals having different OFDM symbol lengths are multiplexed, high-accurate channel estimation can be performed.

BRIEF DESCRIPTION OF DRAWINGS

FIGS. 8A to 8C are diagrams illustrating signals in a channel estimator according to the present embodiment.

DESCRIPTION OF EMBODIMENTS

A terminal apparatus is a generic term for a mobile or fixed user-end terminal apparatus, such as User Equipment (UE), a mobile station (Mobile Station (MS), MobileTerminal (MT)), a mobile station device, a mobile terminal unit, a subscriber unit, a subscriber station, a wireless terminal, a mobile device, a node, a device, a remote station, a remote terminal, a wireless communication apparatus, a wireless communication apparatus, a user agent, and an access terminal. The base station apparatus is a generic term for any given node at a network end communicating with terminals, such as a node B (NodeB), an enhanced node B (eNodeB), a base station, and an Access Point (AP). It is assumed that the base station apparatuses include a Remote Radio Head (RRH, a device, including an outdoor radio unit, that is smaller than the base station apparatus, also referred to as a Remote Radio Unit (RRU)) (also referred to as a remote antenna or a distributed antenna). It can be said that RRH is a special configuration of the base station apparatus. For example, it can be said that RRH is a base station apparatus including only a signal processing unit, and another base station apparatus, for example, configures parameters used by RRH and determines scheduling.

Embodiments of the present invention will be described below in detail with reference to the drawings.

First Embodiment

Figure 1:
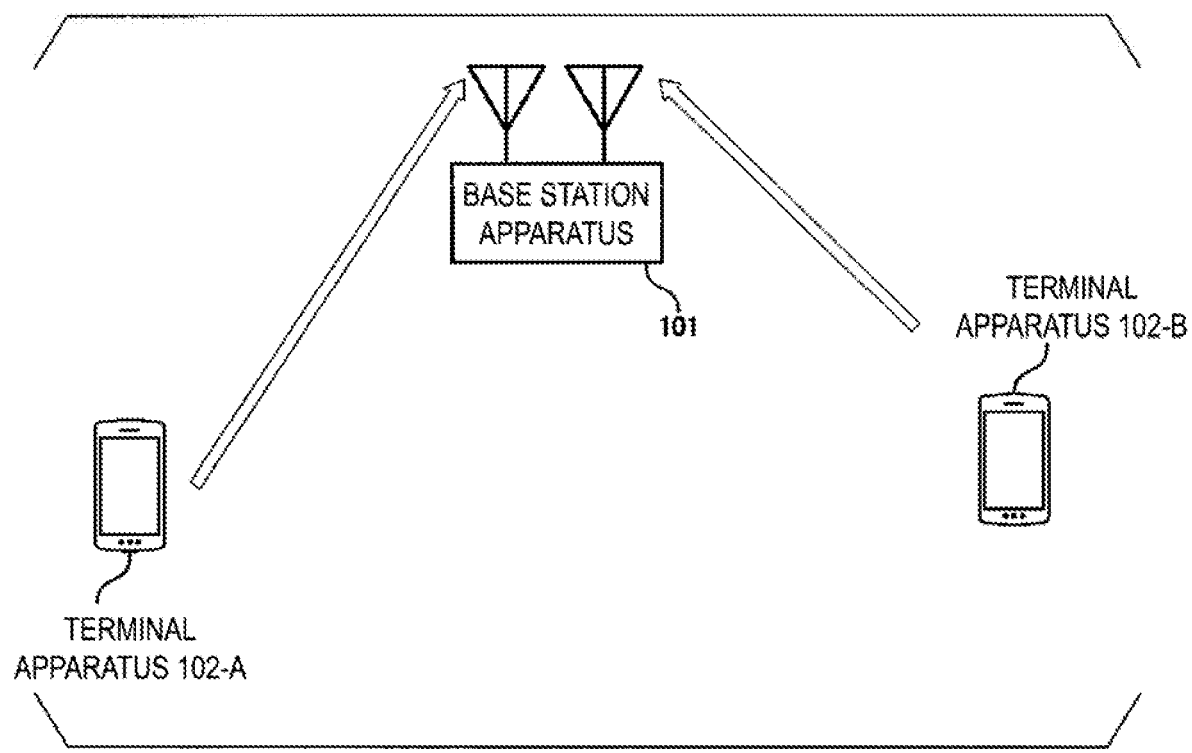
FIG. 1 is a schematic block diagram illustrating a configuration of a wireless communication system according to the present embodiment.

FIG. 1 is a schematic block diagram illustrating a configuration of a wireless communications system according to the present embodiment. This system includes a base station apparatus 101, a terminal apparatus 102-A, and a terminal apparatus 102-B. In FIG. 1, the terminal apparatus 102-A performs transmission by using a narrow subcarrier spacing (for example, 15 kHz), and the terminal apparatus 102-B performs transmission by using a wide subcarrier spacing (for example, 30 kHz). The base station apparatus 101 allocates radio resources used for uplink transmission to the terminal apparatus 102-A with Downlink Control Information (DCI) (also referred to as scheduled access, scheduled-based access, and grant-based access). The base station apparatuses 101 does not allocate the radio resources to the terminal apparatus 102-B with DCI, and the terminal apparatus 102-B may perform transmission by selecting one of at least one radio resource specified by the base station apparatus 101 or one of at least one radio resource predefined (also referred to as grant-free transmission, grant-less transmission, and contention-based transmission). Here, the radio resource specified by the base station apparatus may be notified by using a higher layer (for example, Radio Resource Control (RRC)). Whether to use any of the above-described scheduled access or the above-described grant free may be selected in eMBB communications or URLLC communications. The terminal apparatus 102-A and the terminal apparatus 102-B can support the above-descried multiple narrow subcarrier spacings and wide subcarrier spacings. In this case, the terminal apparatus can notify the base station apparatus of the supported subcarrier spacings with Capability. The terminal apparatus supporting the multiple subcarrier spacings may transmit data at a subcarrier spacing indicated by the base station apparatus. The base station apparatus can transmit subcarrier spacing indication information by using DCI and/or RRC. Note that the number of antenna ports configured in each terminal apparatus may be equal to or more than one. Here, the antenna port means a logical antenna recognizable by an apparatus performing communications, not a physical antenna. With the multiple antenna ports, existing techniques, such as Single User MIMO (SU-MIMO) and transmit diversity, may be applied.

Figure 2:
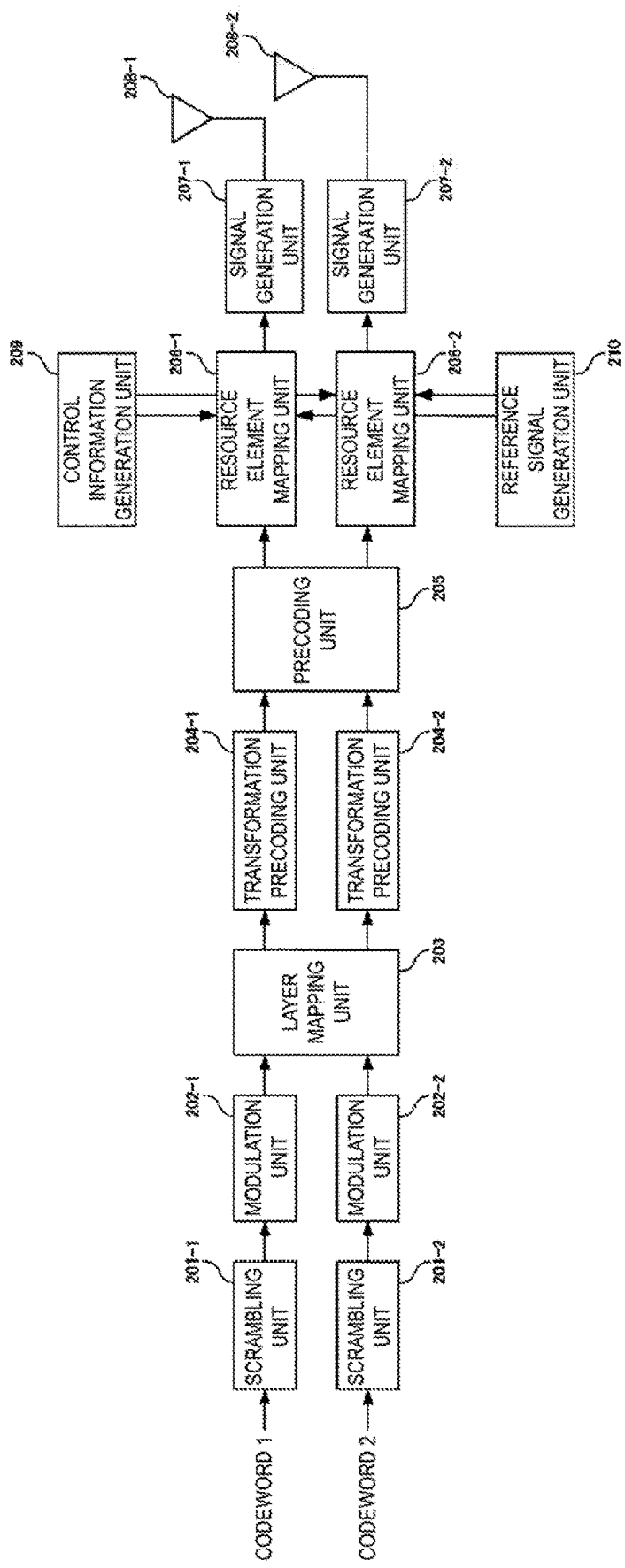
FIG. 2 is a diagram illustrating an example configuration of a transmitter in a terminal apparatus according to the present embodiment.

FIG. 2 is a diagram illustrating an example configuration of a transmitter in the terminal apparatus 102-A according to the present embodiment. Note that FIG. 2 illustrates only blocks (processing units) required to describe the embodiment of the present invention. The terminal apparatus 102-A can also have a similar configuration. Although not illustrated, the terminal apparatuses 102-A and 102-B of FIG. 2 include reception units that receive a downlink signal (downlink control information, RRC signaling, a data signal, or the like) transmitted from the base station apparatus 101.

A coded bit sequence (codeword), in which data of the terminal apparatus 102-A is coded, is input to a scrambling unit 201-1 and a scrambling unit 201-2. Here, in a case that the number of codewords is one, nothing is input to the scrambling unit 201-2. The number of codewords may be three or more. In this case, the scrambling units whose number is identical to the number of codewords are prepared. The scrambling unit 201-1 and the scrambling unit 201-2 apply scrambling, specific to a terminal apparatus and a codeword. Outputs from the scrambling units 201-1 and 201-2 are input to modulation units 202-1 and 202-2, respectively. The modulation units 201-1 and 201-2 perform processing to convert the input bit string into modulation symbols (QPSK modulation symbol and QAM modulation symbol), such as QPSK and 64QAM. While the present embodiment gives the description assuming that a modulation scheme of the terminal apparatus serving as a remote terminal apparatus is always limited to QPSK, the present invention is not limited thereto, and a modulation scheme, such as 16QAM and 64QAM, may be used. Note that the modulation unit that modulates the terminal apparatus serving as a neighborhood terminal apparatus is not limited to QPSK, and a modulation scheme, such as 16QAM and 64QAM, is applied.

Each of outputs from the modulation units 202-1 and 202-2 is input to a layer mapping unit 203. In a case that the terminal apparatus 102-A performs transmission by using multiple layers, the layer mapping unit 203 applies processing that allocates at least one codeword to each of the multiple layers. While the following gives the description assuming that the number of layers is two, any natural number may be used. Outputs from the layer mapping unit 203 are input to transform precoding units 204-1 and 204-2. The transform precoding unit transforms a modulation symbol sequence input from the layer mapping unit 203 by Discrete Fourier Transform (DFT). Note that in a case that the transmission is performed by OFDM, not DFT-spread-Orthogonal Frequency Division Multiplexing (DFT-S-OFDM), the transform precoding units 204-1 and 204-2 perform nothing. Outputs from the transform precoding units 204-1 and 204-2 are input to a precoding unit 205. The precoding unit 205 performs precoding to transmit each layer from multiple antenna ports. Here, the different precoding may be applied according to the processing in the transform precoding units 204-1 and 204-2, that is, whether DFT has been applied or not (or whether a transmission scheme having high Peak to Average Power Ratio (PAPR) is employed or not). While FIG. 2 gives the description assuming that the number of transmit antennas (the number of antenna ports) is two, any natural number equal to or more than the number of layers may be used. Outputs from the precoding unit 205 are input to resource element mapping units 206-1 and 206-1. The resource element mapping units 206 map the signal input from the precoding unit 205 in any radio resource (the resource element and the subcarrier). Note that a resource element to be used is determined based on the input from a scheduling unit (not illustrated). The resource mapping units 206-1 and 206-2 also perform processing that maps control information (for example, Downlink Control Information (DCI)) input from a control information generation unit and a reference signal (for example, a DeModulation-Reference Signal (DM-RS), a Common Reference Signal (CRS), and a Channel Statement Information-Reference Signal (CSI-RS)) input from a reference signal generation unit in predetermined resource elements. DM-RS and CSI-RS are terminal-specific reference signals. CRS is a cell-specific reference signal. DM-RS is a reference signal used in demodulation of data. CSI-RS is a reference signal used in Measurement. CRS can be used in the data demodulation or/and Measurement.

Outputs from the resource element mapping units 206-1 and 206-2 are input to signal generation units 207-1 and 207-2, respectively. The signal generation units 207-1 and 207-2 apply Inverse Fast Fourier Transform (IFFT) to the inputs from the resource element mapping units 206-1 and 206-2 and add Cyclic Prefixes (CPs). Note that the terminal apparatus 102-A performs the transmission using the narrow subcarrier spacing (that is, the long OFDM symbol length) and therefore applies IFFT with a large number of points (for example, 2048 points). Meanwhile, the terminal apparatus 102-B performs the transmission using the wide subcarrier spacing (that is, the short OFDM symbol length) and therefore applies IFFT with a small number of points (for example, 512 points). Furthermore, processing, such as D/A conversion, transmission power control, filtering, and up-conversion, is applied. Outputs from the signal generation units 207-1 and 207-2 are transmitted from antennas 208-1 and 208-2.

Here, the transmission power control may be performed such that URLLC allows the base station apparatus 101 to perform the reception with higher energy (power spectral density) than eMBB. That is, a communication using the wide subcarrier spacing may use higher power for transmission than a communication using the narrow subcarrier spacing. The transmission power is configured based on components such as a bandwidth in which the data is mapped, a target reception power in the terminal apparatus of the data, and a path loss. For example, the power of the transmission power in a communication using the wide subcarrier spacing is configured to be higher than that in a communication using the narrow subcarrier spacing based on the target reception power. The target reception power specific to the terminal apparatus or/and specific to the cell can be configured by using RRC. Furthermore, the transmission power may be adjusted based on, for example, a correction term to the transmission power calculated with the components. For example, the transmission power is adjusted to the transmission power calculated with the components based on the correction term specific to the subcarrier spacing. The power of the transmission power in a communication using the wide subcarrier spacing is adjusted to be higher than that in a communication using the narrow subcarrier spacing based on the correction term. The correction term may be notified from the base station apparatus by using RRC or/and DCI.

Figure 3:
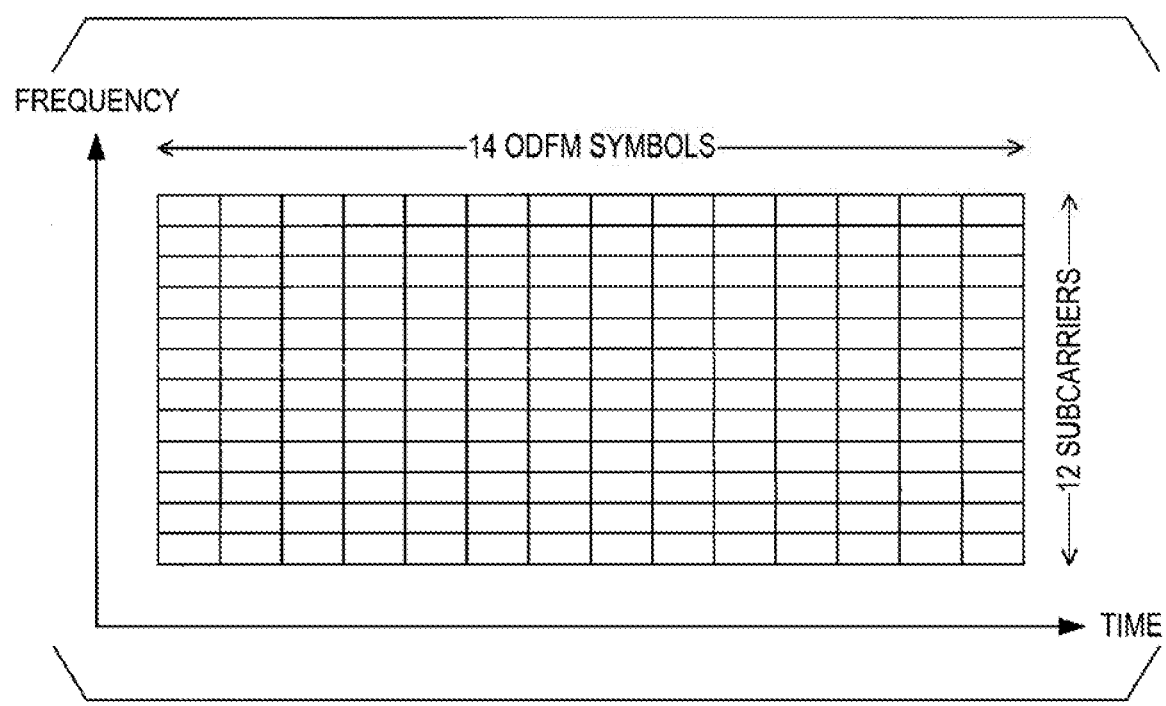
FIG. 3 is a diagram illustrating an example configuration of a subframe with a long OFDM symbol length according to the present embodiment.
Figure 4:
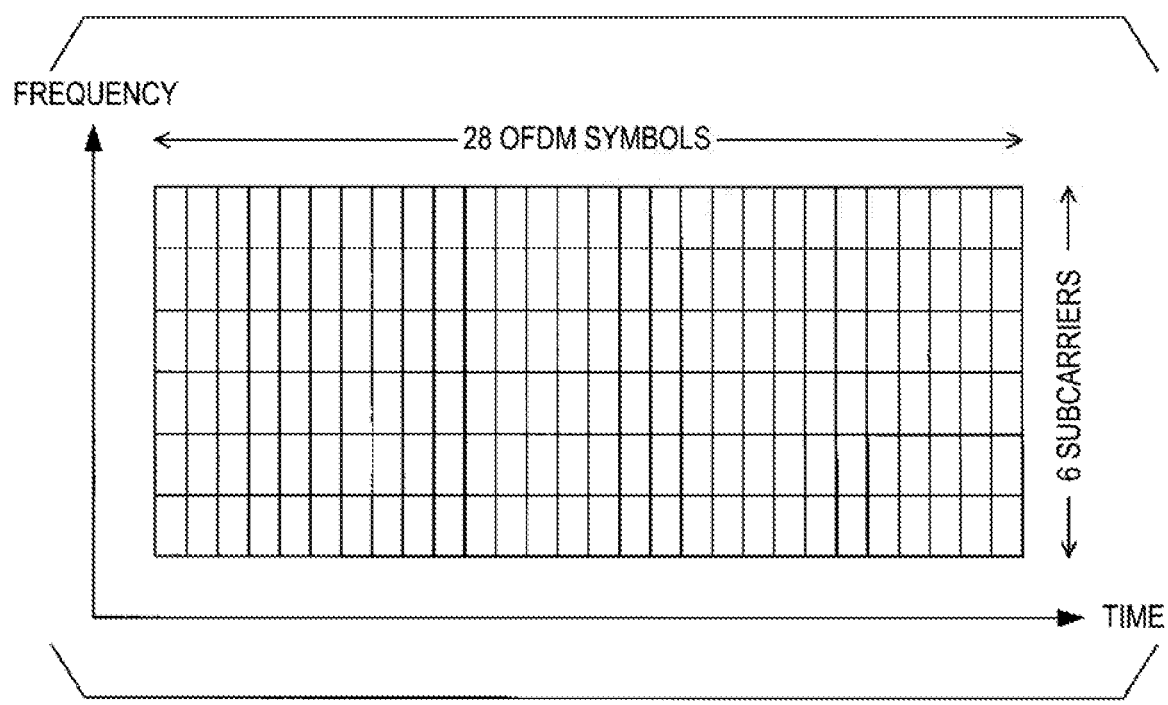
FIG. 4 is a diagram illustrating an example configuration of the subframe with a short OFDM symbol length according to the present embodiment.

Next, the following describes a configuration of a radio frame (a subframe, a slot, and a mini slot) performed by the resource mapping unit. FIG. 3 illustrates resource blocks at the subcarrier spacing of 15 kHz. In a case of 15 kHz, one resource block includes 12 subcarriers and 14 OFDM symbols, and an allocation is performed in units of the resource blocks. FIG. 4 illustrates the resource blocks at the subcarrier spacing of 30 kHz. One resource block at 30 kHz includes six subcarriers and 28 OFDM symbols, and not only the allocation in units of the resource blocks but also the allocation in units of at least one OFDM symbol is performed. That is, in terms of time, the terminal at 30 kHz can transmit the signals in some of the resource blocks used by the terminal at the subcarrier spacing of 15 kHz.

Figure 5:
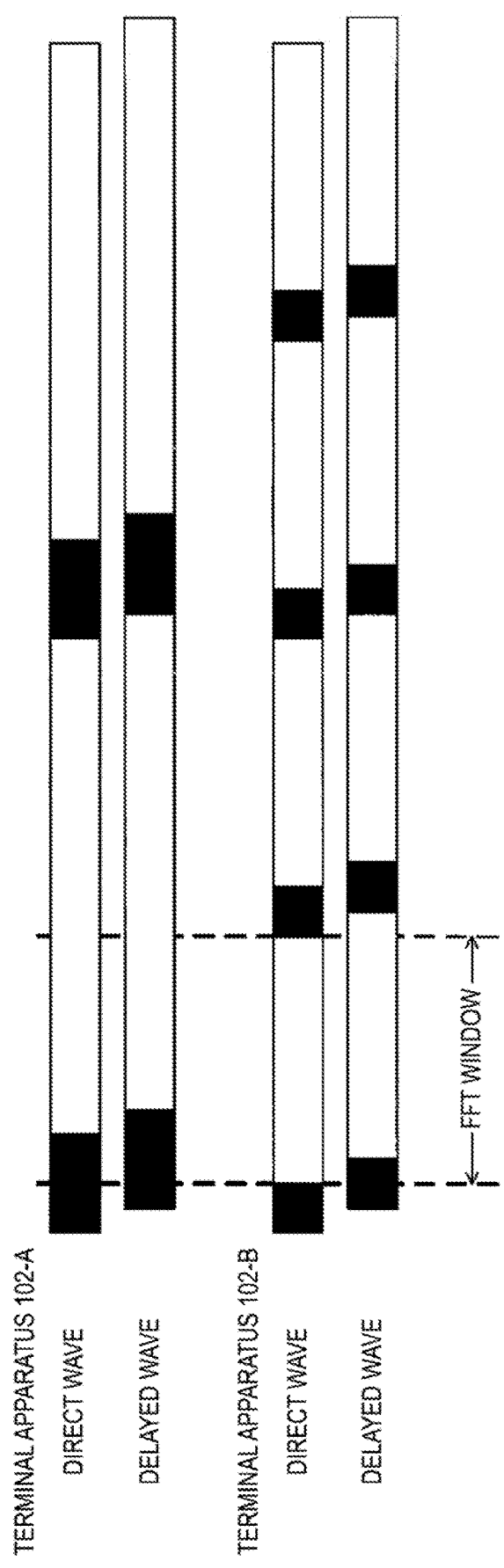
FIG. 5 is a diagram illustrating a state of reception in a base station apparatus in a case that the OFDM symbol lengths are different according to the present embodiment.

Next, the following describes the frame configuration according to the present embodiment. FIG. 5 illustrates OFDM symbols of the terminal apparatus at Sub-Carrier Spacing (SCS) of 15 kHz and the terminal apparatus at SCS of 30 kHz. As illustrated in the drawing, in an FFT window corresponding to the terminal apparatus 102-B at SCS of 30 kHz, a reception signal in direct wave and a reception signal in delayed wave of the terminal apparatus 102-A at SCS of 15 kHz do not meet the periodicity, causing interference. As a result, in a case that the OFDM symbol includes the reference signal (pilot symbol), the channel estimation accuracy is degraded.

Figure 6:
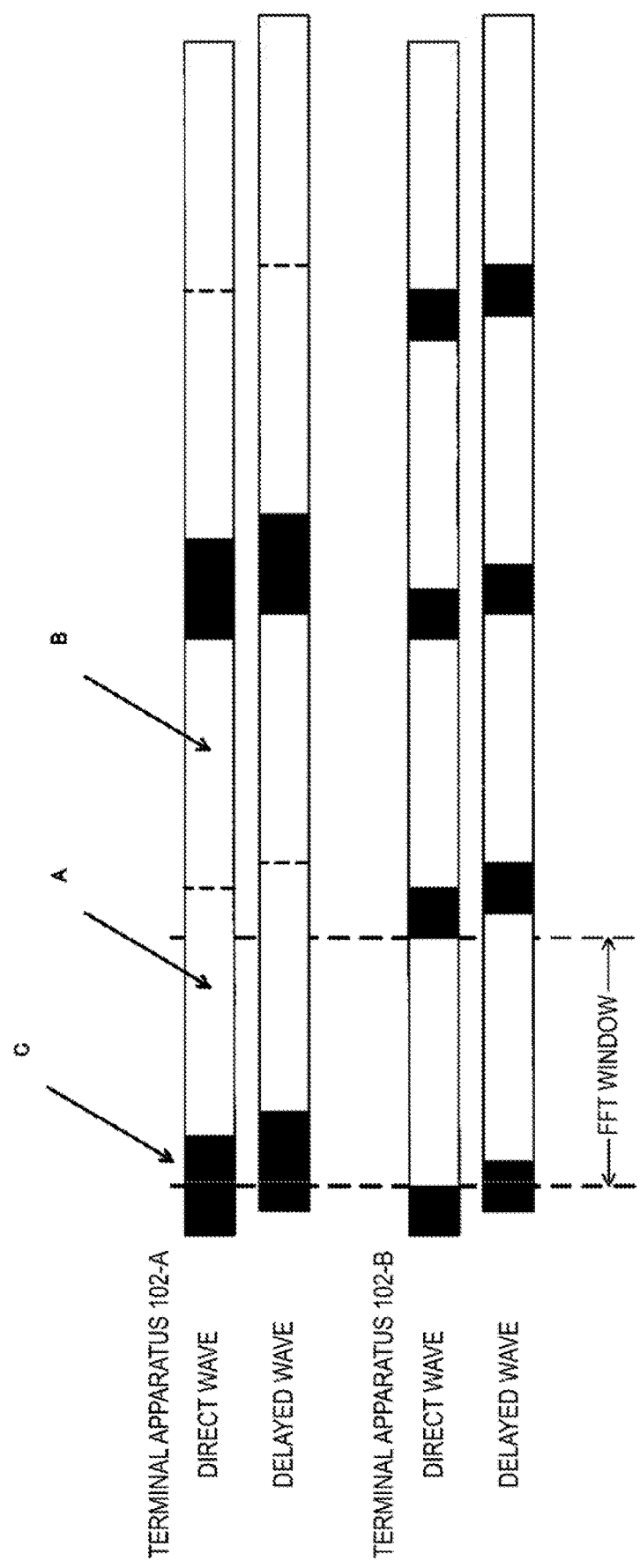
FIG. 6 is a diagram illustrating a state of reception in the base station apparatus in a case that a reference signal is repeatedly transmitted according to the present embodiment.

FIG. 6 illustrates a case that the terminal apparatus 102-A repeatedly transmits the identical signal in the OFDM symbols including the reference signals. In other words, in the drawing, the identical signal is transmitted in the former half (A) of the OFDM symbol and the latter half (B) of the OFDM symbol. This allows CP (C) of the OFDM symbol to be a copy of the later part of B and also to be a copy of the later part of A. As a result, the reception signal in the direct wave and the reception signal in the delayed wave of the terminal apparatus 102-A meet the periodicity in the FFT window of the terminal apparatus at SCS of 30 kHz. Consequently, the interference caused by the different OFDM symbol lengths does not occur, thus ensuring the channel estimation free from the interference. Note that while the signal identical to the former half (A) of the OFDM symbol is transmitted in the latter half (B) of the OFDM symbol in FIG. 6, the latter half (B) may be a period in which no signal is transmitted. Such a period allows interference with the data of the terminal apparatus 102-B to be prevented and also allows power consumption to be reduced. Note that the later part of the former half (A) in which the reference signal is transmitted may be copied to the period of CP (C) or the later part of the latter half (B) may be copied to the period of CP(C), that is, the period of CP(C) may be caused to be a period in which no signal is transmitted. Furthermore, CP (C) may be determined in accordance with the terminal apparatus 102-B, that is, a CP length and an OFDM length of another terminal apparatus, regardless of another OFDM symbol and a predetermined OFDM symbol.

The base station apparatus 101 notifies whether the terminal apparatus 102-A repeatedly transmits the signals or not. The base station apparatus notifies the terminal apparatus 102-A of the number of repetitions according to SCS used by a terminal apparatus spatially-multiplexed with the terminal apparatus 102-A. For example, in a case that SCS of the terminal apparatus 102-A is 15 kHz and SCS of the terminal apparatus 102-B is 30 kHz, the base station apparatus 101 notifies to the terminal apparatus 102-A that the number of repetitions is two. In a case that SCS of the terminal apparatus 102-B is 60 kHz, the base station apparatus 101 notifies to the terminal apparatus 102-A that the number of repetitions is four. The resource element mapping unit in the terminal apparatus 102-A forms the signal such that the OFDM symbol including the reference signal meets the number of repetitions notified from the base station apparatus. The terminal apparatus 102-A may determines that the signal is repeated in a case that the terminal apparatus 102-A receives the information on the repetition. In a case that the terminal apparatus 102-A does not receive the information on the repetition, the terminal apparatus 102-A determines that the signal is transmitted without repetition. In a case that the terminal apparatus 102-A does not receive the information on the repetition, the terminal apparatus 102-A determines that the signal is transmitted by a default configuration of the reference signal. Furthermore, in a case that the terminal apparatus 102-A receives the information on the repetition, the terminal apparatus 102-A forms the signal so as to meet the number of repetitions included in the information on the repetition. Note that the information on the number of repetitions notified from the base station apparatus 101 may be dynamically notified by using DCI, may be semi-statically notified by using a higher layer (for example, RRC), or may be broadcasted or groupcasted as system information (System Information Broadcast, SIB). Furthermore, the information on the number of repetitions may be a length of a sequence as a repetition source, not the number of repetitions. For example, in a case that the terminal apparatus at SCS of 15 kHz and the terminal apparatus at SCS of 30 kHz are spatially-multiplexed, information indicative of 1024, which is an IFFT size of the terminal apparatus at SCS of 30 kHz, may be notified to the terminal apparatus at SCS of 15 kHz. That is, the number of repetitions may be associated with other configuration information and implicitly notified.

The information on the number of repetitions can also be associated with the subcarrier spacing with a subcarrier spacing index. The base station apparatus can notify the terminal apparatus of the subcarrier spacing and the number of repetitions through transmission of the subcarrier spacing index. The subcarrier spacing index can be transmitted by using DCI/RRC. The base station apparatus may transmit the information on the number of repetitions or the subcarrier spacing index together with an ACK/NACK signal. The terminal apparatus retransmits the signal in accordance with the information on the number of repetitions or the subcarrier spacing index.

Next, the following describes specific processing in the resource element mapping unit. In a case that signal waveforms are repeatedly output in the time domain, any configuration may be employed, though, the present embodiment gives the description on two methods. In the first method, the resource mapping is performed assuming that the terminal apparatus 102-A uses an IFFT size of 1024 points for an OFDM symbol including a reference signal, the IFFT size being half of that for other OFDM symbols. For example, in a case of an allocation from the X-th frequency index to the (X+G)-th frequency index with the frequency index of 2048 points, the reference signals are allocated from the X/2-th to the (X+G)/2-th frequency index with the assumption of 1024 points. Thereafter, the method applies IFFT of which size is half of that for other OFDM symbols in IFFT processing of the signal generation unit, repeats the generated signal twice, and adds CP. This method only needs to perform FFT with the small size once, thus allowing the amount of computation to be reduced. The second method is a method of inserting zeros (null carriers) into the output to the resource element mapping unit. For example, with the input signals of a, b, c, d . . . , z, the resource element mapping unit generates a, 0, b, 0, c, 0, d, 0 . . . 0, z, 0, and maps the generated signal in the predetermined resources. The signal generation unit can generate a signal to be repeated twice by performing IFFT of which size is the same as that for other OFDM symbols. Note that all the input signals a, b, c, d . . . z may be the reference signals, or only some of the input signals may be the reference signals and the remaining signals may be the data signals and control information signals.

While the addition of CP to the head of the OFDM symbol has been described above, a zero period or a predetermined sequence may be added instead of CP.

Since the reference signals transmitted by the terminal apparatus 102-A and the terminal apparatus 102-B need to be separated, the reference signals are configured to be separable in FDMA, TDMA, CDMA, or the like. For example, in a case of CDMA, it is only necessary to provide spreading codes (cyclic delay and/or a Walsh matrix) different depending on each terminal apparatus. The spatially-multiplexed reference signals are separated in LTE, and therefore Cyclic Shift (CS) and Orthogonal Cover Code (OCC) are used to perform separation. Providing a predetermined amount of rotation in the adjacent subcarrier allows generation of a signal orthogonal to a signal to which the different amount of rotation is provided. In the present embodiment, the orthogonal reference signal can be formed by applying CS such that the amount of rotation with respect to the adjacent subcarrier other than a null carrier (a subcarrier with a zero amplitude) becomes constant.

Figure 7:
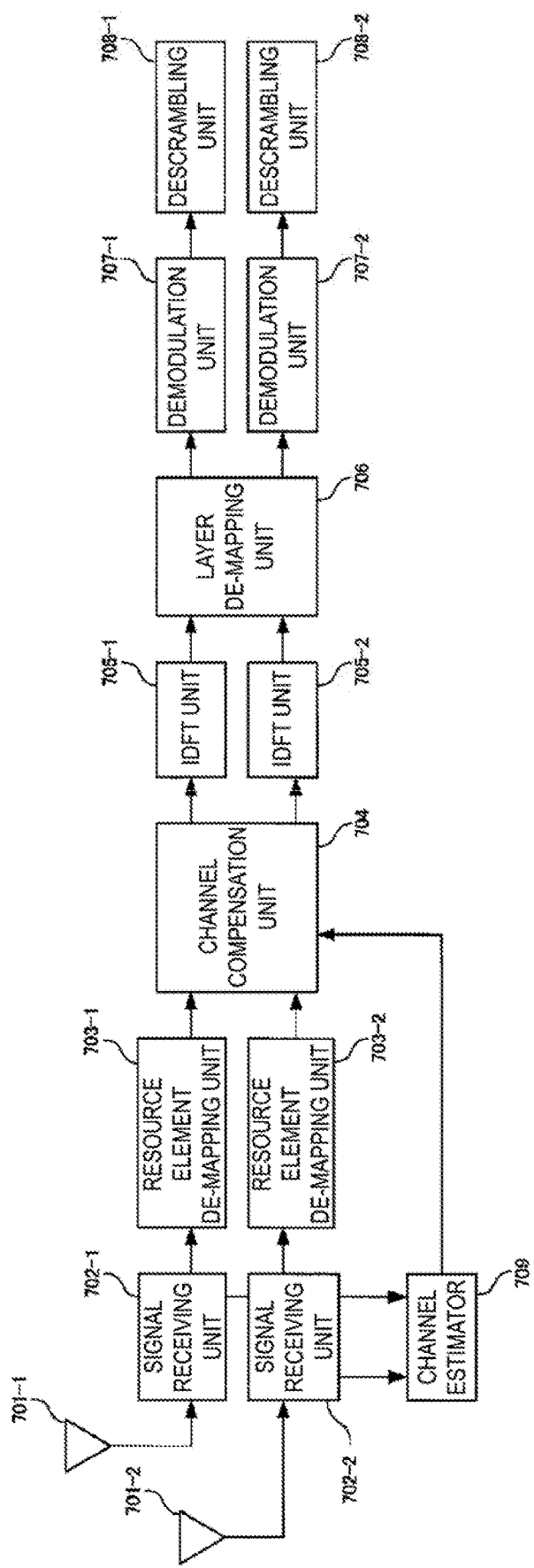
FIG. 7 is a diagram illustrating an example configuration of a transmitter in the base station apparatus according to the present embodiment.

Next, the following describes the base station apparatus 101 that receives the signal transmitted from the terminal apparatus 102-A and the terminal apparatus 102-B. FIG. 7 is a diagram illustrating an example configuration of a receiver in the base station apparatus 102 according to the present embodiment. Note that FIG. 7 illustrates only blocks (processing units) required to describe the embodiment of the present invention. The base station apparatus 101 includes a transmission unit, not illustrated, that transmits Uplink Control Information (UCI), the RRC signaling (such as Capability), and the data signal) transmitted from the terminal apparatuses 102-A and 102-B.

The signals transmitted from the terminal apparatus 102-A and the terminal apparatus 102-B are received by a receive antenna 701-1 and a receive antenna 701-2. Here, although the description is given assuming that the number of receive antennas is two, the number of receive antennas may be one, or equal to or more than three. A signal receiving unit 702-1 and a signal receiving unit 702-2 perform a down-conversion, A/D conversion, a removal of CP, an application of FFT, and similar processing on the signals received at the receive antennas. While demodulation of the terminal apparatus 102-A is described here, to demodulate the terminal apparatus 102-B, FFT is performed with the number of points of IFFT used in the transmitter in the terminal apparatus 102-B. The signal including the reference signal after the A/D conversion is input to a channel estimator 709. Processing in the channel estimator will be described later. Outputs from the signal receiving unit 702-1 and the signal receiving unit 702- are input to a resource element demapping unit 703-1 and a resource element demapping unit 703-2, respectively. The resource element demapping units 703-1 and 703-2 extract resource elements used for communications with the terminal apparatus 102-A by using scheduling information input from the scheduling unit not illustrated. An output from the resource element demapping unit 703 is input to a signal detector 904. A channel compensation unit 704 applies processing that compensates for an influence on a channel. With multiple receive antennas, the channel compensation unit 704 applies the spatial filtering and MLD to detect only signals addressed to the terminal apparatus 102-A. Outputs from the channel compensation unit 704 are input to an IDFT unit 705-1 and an IDFT unit 705-2. While the present embodiment gives the description assuming that the number of layers is 2, the number of layers may be one, or equal to or more than three. The IDFT unit 705-1 and the IDFT unit 705-2 apply IDFT for transformation to a signal in the time domain. Here, IDFT is applied only in a case that the transform precoding unit 204-1 and the transform precoding unit 204-2 as the transmitters in FIG. 2 apply precoding (DFT). While the IDFT unit 705-1 and the IDFT unit 705-2 apply IDFT in a case that the precoding is DFT, the configuration is not limited thereto, and the precoding unit performs inverse transformation of the transformation. Furthermore, whether to apply IDFT or not can be determined for each layer. Outputs from the IDFT unit 705-1 and the IDFT unit 705-2 are input to a layer demapping unit 706. In a case that the signal transmitted from the terminal apparatus 102-A includes multiple layers (streams), the layer demapping unit 706 performs transformation to codewords. Outputs from the layer demapping unit 706 are input to a demodulation unit 707-1 and a demodulation unit 707-2.

The demodulation unit 707-1 and the demodulation unit 707-2 perform processing that calculates Log Likelihood Ratio (LLR) of a bit sequence from the input reception signal sequence. The bit LLR sequence output from the demodulation unit 707-1 and the demodulation unit 707-2 are input to a descrambling unit 708-1 and a descrambling unit 708-2. The descrambling unit 708-1 and the descrambling unit 708-2 descramble the scramblings specific to the terminal apparatuses. Processing, such as decoding, is applied to the coded bit sequences output from the descrambling unit 708-1 and the descrambling unit 708-2 in the reception device.

Next, the following describes the channel estimator 709 of the present embodiment. The channel estimator 709 for detecting the signal from the terminal apparatus 102-A performs different processing depending on whether another terminal apparatus (for example, the radio terminal apparatus 102-B) is present in the radio resource used by the terminal apparatus 102-A. In a case that another terminal apparatus is absent, since the channel estimator 709 does not receive signals repeated in the time domain by the transmitter, the channel estimator 709 performs FFT with the large number of FFT points (for example, 2048). On the other hand, in a case that another terminal apparatus is present, since the channel estimator 709 receives the signals repeated in the time domain, the channel estimator 709 performs FFT with the small number of FFT points (for example, 2048). That is, FFT is applied in the FFT window of FIG. 6. Accordingly, the channel estimator 709 performs the channel estimation by using the reception signal having the number of subcarriers (spacing) different from that of data (PUSCH). Note that the scheduling unit in the base station apparatus 101 notifies whether another terminal apparatuses is present or not. Although the description has been given in the case of the uplink, in a case of downlink, the base station apparatus 101 notifies the terminal apparatus 102-A and the terminal apparatus 102-B of the information on the repetition. The notification may be performed dynamically by using DCI or may be performed semi-statically by using RRC.

FIGS. 8A to 8C describe examples of the channel estimation method by the channel estimator 709. As illustrated in FIG. 8A, in a case that another terminal apparatus is present, the channel estimator 709 performs the channel estimation with the number of FFT points smaller than that of a data part. In a case that the channel estimation is performed by FFT with the number of FFT points half of the original number of FFT points, 0 is inserted as in FIG. 8B to double the number of frequency indices. Here, in a case of four times the original number of FFT points, three 0s are inserted into one spectrum, thus quadrupling the number of frequency indices. Afterward, an interpolation process is applied by using odd spectra of FIG. 8B, and the channel estimation is performed in all frequency indices as in FIG. 8C. Here, existing interpolation methods, such as a linear interpolation and an MMSE interpolation, are usable as the interpolation method. While the example of the channel estimation by using the former half of the OFDM symbol, that is, only the part of A in FIG. 6 has been described above, B also includes the reference signal; therefore, the channel estimation may be performed by using B. However, in a case that the radio resources are shared with terminal apparatus 102-B, the data in the terminal apparatus 102-B is decoded, a reception signal replica is generated from the obtained data, a subtraction is performed from the reception signal, and then the channel estimation is performed; or an interference from the terminal apparatus 102-B is suppressed through filtering or a similar method and then the channel estimation is performed. The obtained channel estimation result is input to the channel compensation unit.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily loaded into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In this case, the programs achieving the functions of the embodiments may be recorded in a computer-readable recording medium. The configuration may be achieved by causing a computer system to read the program recorded in this recording medium and to execute the program. It is assumed that the "computer system" refers to a computer system built into the apparatuses, and the computer system includes an operating system and hardware components such as a peripheral device. The "computer-readable recording medium" may be any of a semiconductor recording medium, an optical recording medium, a magnetic recording medium, and a similar medium.

Moreover, the "computer-readable recording medium" may include a medium, such as a communication wire for transmitting the program via a network such as the Internet or a communication line such as a telephone line, that dynamically holds the program for a short period of time, and a medium, such as a volatile memory inside the computer system serving as a server or a client in such a case, that holds the program for a certain period. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a known processor, a controller, a microcontroller, or a state machine. The above-described electric circuit may include a digital circuit or may include an analog circuit. Furthermore, in a case that with advances in semiconductor technology, a circuit integration technology appears that replaces the present integrated circuits, it is also possible to use an integrated circuit based on the circuit integration technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention is preferably used for a base station apparatus, a terminal apparatus, and a communication method thereof. An aspect of the present invention can be utilized, for example, in a communication system, communication equipment (for example, a mobile phone apparatus, a base station apparatus, a wireless LAN apparatus, or a sensor device), an integrated circuit (for example, a communication chip), or a program.

REFERENCE SIGNS LIST

101 Base station apparatus
102-A, 102-B Terminal apparatus
201-1, 201-2 Scrambling unit
202-1, 202-2 Modulation unit
203 Layer mapping unit
204-1, 204-2 Transform precoding unit
205 Precoding unit
206-1, 206-2 Resource element mapping unit
207-1, 207-2 Signal generation unit
208-1, 208-2 Transmit antenna
209 Control information generation unit
210 Reference signal generation unit
701-1, 701-2 Receive antenna
702-1, 702-2 Signal receiving unit
703-1, 703-2 Resource element demapping unit
704 Channel compensation unit
705-1, 705-2 IDFT unit
706 Layer demapping unit
707-1, 707-2 Demodulation unit
708-1, 708-2 Descrambling unit
909 Channel estimator

The invention claimed is:

1. A terminal apparatus for communicating with a base station apparatus, the terminal apparatus comprising:
a reception unit configured to receive downlink control information from the base station apparatus;
a resource element mapping unit configured to map a data orthogonal frequency-division multiplexing (OFDM) signal to subcarriers of OFDM and a reference signal to subcarriers of OFDM; and
a signal generation unit configured to transmit a transmission signal including the reference OFDM signal and the data OFDM signal, wherein the downlink control information includes information on the number of repetitions of reference OFDM signal, and the resource element mapping unit is configured to change the number of repetitions of reference OFDM signal according to the information on the repetition of the reference OFDM signal.

2. The terminal apparatus according to claim 1, wherein the information on the number of repetitions is configured according to a subcarrier spacing of the subcarriers.

3. A terminal apparatus for communicating with a base station apparatus, the terminal apparatus comprising the steps of:

receiving downlink control information from the base station apparatus;

mapping a data signal to subcarriers of orthogonal frequency-division multiplexing (OFDM) and a reference signal to subcarriers of OFDM; and transmitting a transmission signal including a reference OFDM signal and a data OFDM signal, wherein the downlink control information includes information on the number of repetitions of the reference OFDM signal, and the mapping changes the number of repetitions of the reference OFDM signal according to the information on the repetition of the reference OFDM signal.

* * * * *